FITCH, DEVOE & McLELLAN.
Coffee Pot.

No. 100,880.          Patented March 15, 1870.

Witnesses:
William W. Herthel
Robert Burns

Inventors:
J. T. Fitch, B. G. Devoe, R. W. McLellan
by their Atty
Herthel

United States Patent Office.

JAMES F. FITCH, B. G. DEVOE, AND R. W. B. McLELLAN, OF VANDALIA, ILLINOIS; SAID McLELLAN ASSIGNS HIS RIGHT TO SAID FITCH AND DEVOE.

Letters Patent No. 100,880, dated March 15, 1870; antedated March 11, 1870.

COFFEE-POT.

The Schedule referred to in these Letters Patent and making part of the same.

*To all whom it may concern:*

Be it known that we, JAMES F. FITCH, B. G. DEVOE, and R. W. B. McLELLAN, of Vandalia, in the county of Fayette, and State of Illinois, have made certain new and useful Improvement in Coffee and Tea-Pots; and we do hereby declare the following to be a full and true description thereof, reference being had to the accompanying drawings and to the letters of reference marked thereon.

In this invention the ground coffee or tea is placed in a vessel having perforated sides, and resting upon the bottom of the inclosing vessel or pot, in which hot water is poured. The vessel containing the coffee or tea has an air-tight cap or cover fitted outside, so as to retain the air which is confined above the coffee or tea. In this wise the said air-volume checks the ebullition which would otherwise take place, and the infusion and extraction of aromatic essences is made without the intermixture of sediment with the hot fluid. At the same time, as the inclosing pot may be tightly closed, the aroma is retained in the fluid extract.

To enable those herein skilled to make and use our said invention, we will now more fully describe the construction and operation thereof, reference being had to the accompanying drawings, of which—

Figure 1:
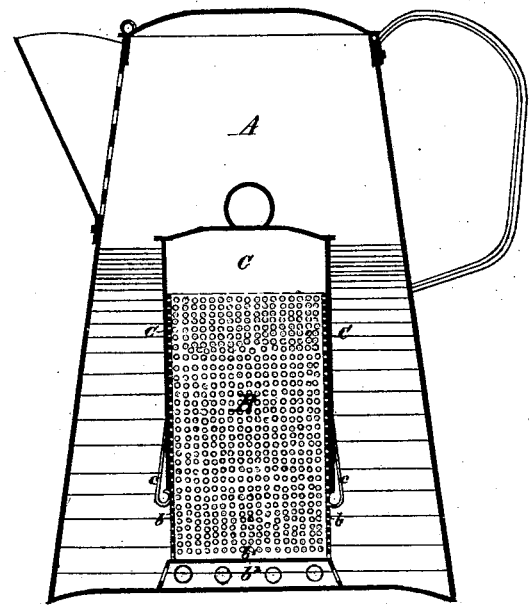
Figure 1 is a sectional elevation.
Figure 2:
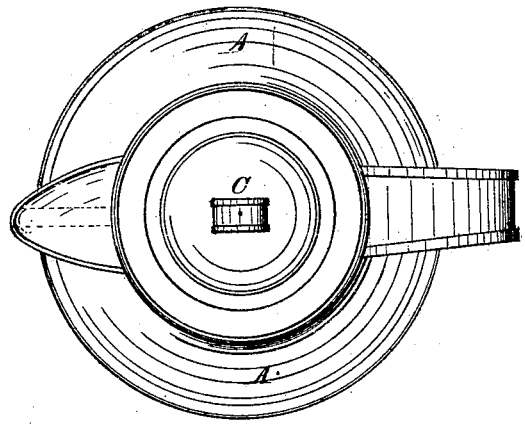
Figure 2 is a plan with the exterior lid or cover removed, said figures showing our said invention in one of its usual forms of application.

We use a pot or vessel, A, of any usual form or material, as in ordinary tea or coffee-pots or boilers, it being a part of this invention to conform the interior vessels to any of the usual pots or boilers in use, as aforesaid.

Within said pot we place the coffee (or tea) holder B, this being a cylindrical vessel having perforated sides $b$, and the solid bottom $b^1$ thereof being raised above the bottom of the pot by the perforated base $b^2$.

The coffee or tea is placed, in the usual form, in said holder B.

Without and over the holder B we arrange the cap or cover C; this is an air-tight vessel (without bottom) having a top with the usual ring or knob for handling it.

The cap C slides over the holder B, and to hold the cap in any desired position it is arranged with springs $c$, which press against the outer circumference of the holder.

The parts being thus arranged, hot water (or simply cold water) is placed in the vessel A, which thereupon surrounds the coffee or tea-holder B and cap C, and owing to the perforated base $b^2$ also passes under said holder B.

The air confined in the cap C is then prevented from escape by said surrounding liquid, and on the application of heat the liquid when boiling will act in the usual manner (but in an increased degree) to extract the flavoring essential parts of the coffee or tea.

In said process of heating, the water will bubble and circulate as usual, but, owing to the confined air above the coffee or tea in the holder, the said circulation and agitation is checked in the holder, and thus sediment is prevented from drawing off into the fluid, and a pure, clear coffee or tea fluid results.

Moreover, as the process of extraction is here attained without undue agitation, the vessels A B and C are kept cleanly, and the use of the entire apparatus is made economical and agreeable.

If the lid or cover of the pot A is held closed, and the spout has a proper cap or lid, then the aroma of the infused liquid will be retained, and thus the full strength of the beverage will be utilized.

Having thus fully described our said invention,

What we claim is—

1. So arranging the vessel or vessels holding the infusion that the air above the infusion shall be confined by surrounding fluid, and act to prevent bubbling or agitation in boiling in the said vessel or vessels, substantially as set forth.

2. The vessel B arranged with perforated sides $b$ and base $b^2$ and solid bottom $b^1$, when combined with the movable cap C and the pot A, substantially as set forth.

3. The cap C, its springs $c$, and the vessel B, when combined as set forth.

In testimony whereof we have hereunto set our hands in the presence of witnesses.

JAMES F. FITCH.
B. G. DEVOE.
R. W. B. McLELLAN.

Witnesses:
J. N. McCORD,
AUG. SOHNKAR.